March 6, 1928. J. A. BALL ET AL 1,661,157
CINEMATOGRAPHIC APPARATUS
Filed July 21, 1923   5 Sheets-Sheet 1
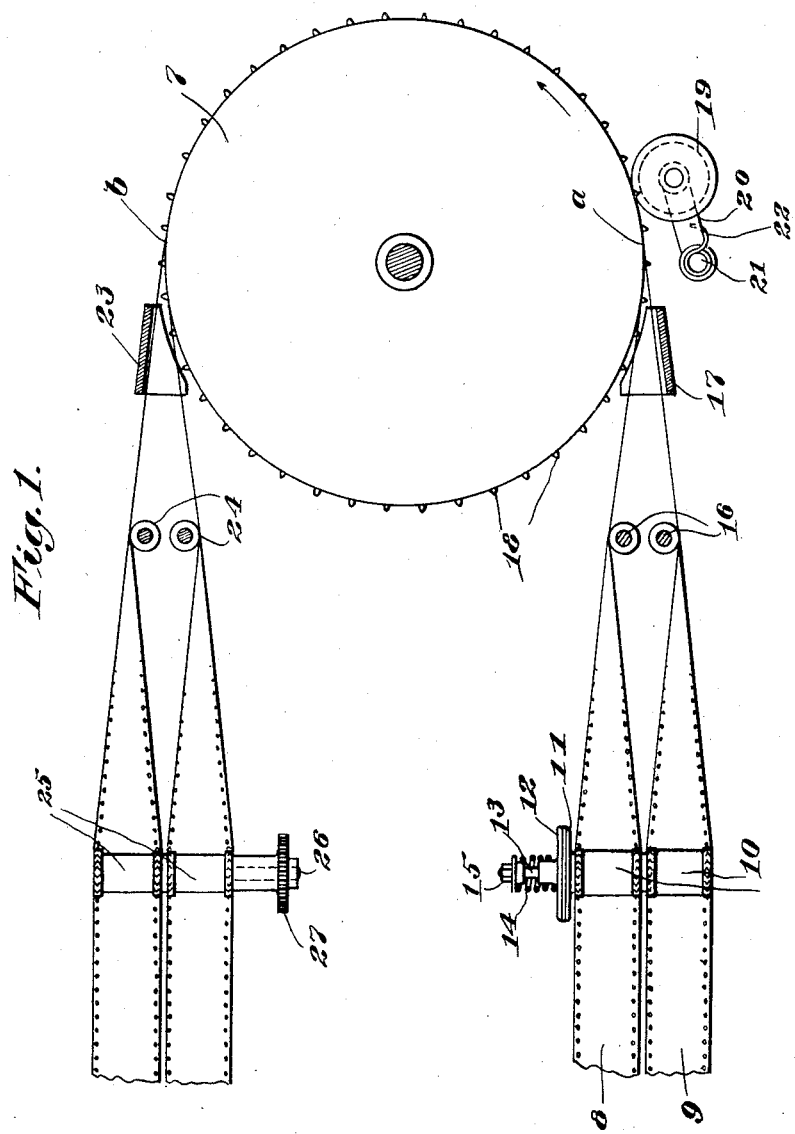

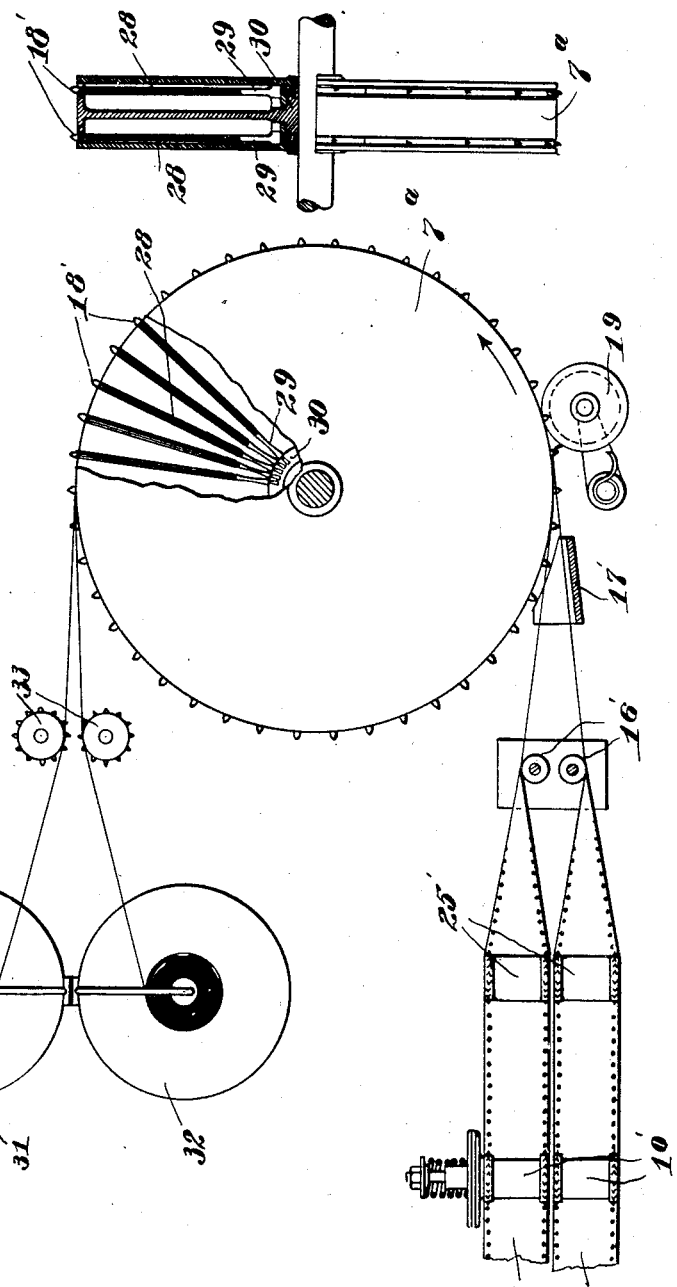

March 6, 1928.
J. A. BALL ET AL
1,661,157
CINEMATOGRAPHIC APPARATUS
Filed July 21, 1923     5 Sheets-Sheet 3
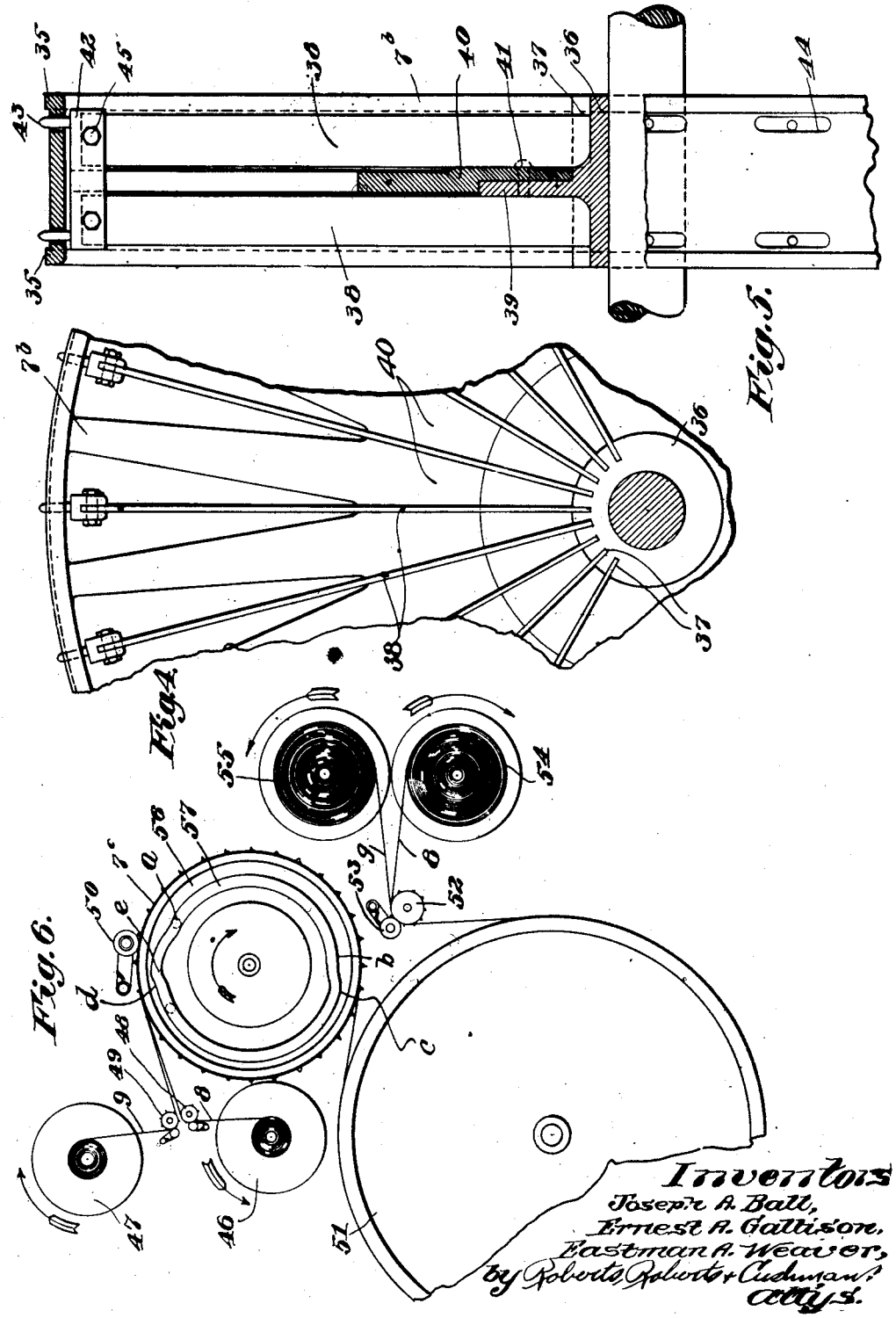

March 6, 1928. 1,661,157
J. A. BALL ET AL
CINEMATOGRAPHIC APPARATUS
Filed July 21, 1923 5 Sheets-Sheet 4
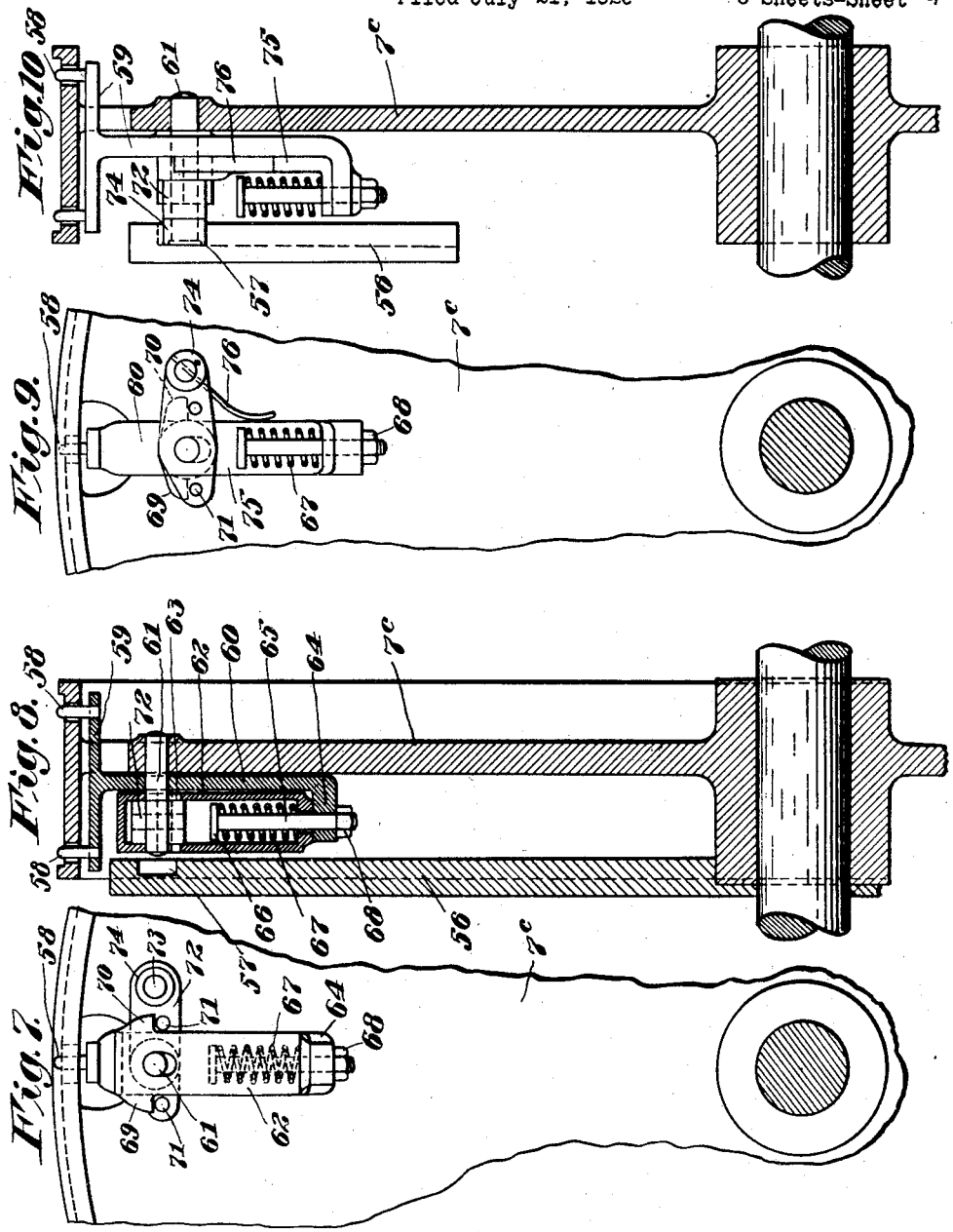
Inventors:
Joseph A. Ball,
Ernest A. Gallison,
Eastman A. Weaver,
by Roberts, Roberts & Cushman
Attys.

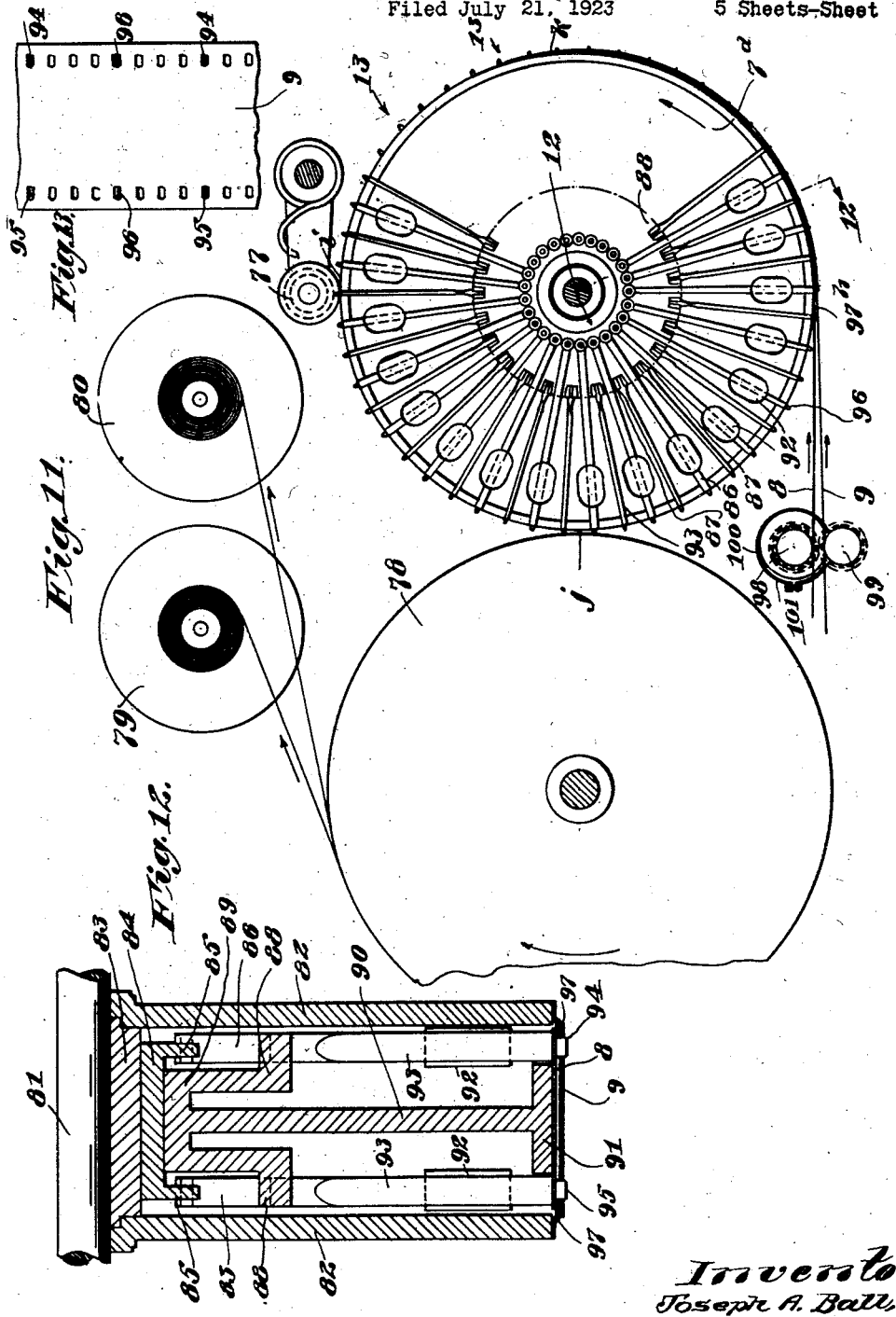

Patented Mar. 6, 1928.

1,661,157

UNITED STATES PATENT OFFICE.

JOSEPH A. BALL, OF CAMBRIDGE, ERNEST A. GALLISON, OF WATERTOWN, AND EASTMAN A. WEAVER, OF BROOKLINE, MASSACHUSETTS, ASSIGNORS TO TECHNICOLOR MOTION PICTURE CORPORATION, OF BOSTON, MASSACHUSETTS, A CORPORATION OF MAINE.

CINEMATOGRAPHIC APPARATUS.

Application filed July 21, 1923. Serial No. 652,893.

This invention relates to the continuous registration of a plurality of cinematographic films for any purpose, such as cementing two complemental films together with their images in exact superposition, but particularly for the purpose of printing a blank film from a matrix film by the imbibition of dye from one to the other film.

Owing to the shrinkage and expansion of films due to changing conditions of moisture to which they are subjected in the liquid processes of forming the images and in the air before and after the images are formed it is extremely difficult to bring the successive portions of long lengths of cinema films into registered superposition with the precision necessary for steady and uniform projection of the finished pictures. While this difficulty is encountered to some extent in the black-and-white branch of the art it is far more troublesome in the color branch of the art, particularly in subtractive films where the complemental images are disposed in superposition.

The object of this invention is to provide a method and apparatus by which cinematographic films of any length may be brought together in registry with speed and accuracy and without injury to the sprocket holes or other registering openings in the films.

The invention consists in the process and apparatus hereinafter claimed, certain illustrative embodiments being shown in the accompanying drawings, in which:—

Fig. 1 is a side elevational view of one form of apparatus;

Fig. 2 is a similar view of a modified form of apparatus;

Fig. 3 is an end elevational view partly in section of the registering drum shown in Fig. 2;

Fig. 4 is a fragmentary side elevational view of another form of registering drum for use in the apparatus disclosed in Fig. 2;

Fig. 5 is an elevational view partly in section of the drum shown in Fig. 4;

Fig. 6 is a diagrammatical side elevation of another form of apparatus;

Figs. 7 and 8 are respectively a fragmentary side elevational and a radial sectional view of the registering apparatus for use in the modification shown in Fig. 6;

Figs. 9 and 10 are respectively a side elevational view and a radial sectional view of another form of registering apparatus for use in the modification shown in Fig. 6;

Fig. 11 is a side elevational view of another modification;

Fig. 12 is a transverse sectional view of the registering drum on the line 12—12 of Fig. 11; and Fig. 13 is a plan view of a portion of the films as they appear at 13—13 of Fig. 11, showing the positions of the pins of drum $7^d$ in the sprocket holes.

The particular embodiment of the invention shown in Fig. 1 comprises a rotary drum 7 having film registering teeth or pins 18 on its periphery, the pins preferably being shaped to fit the film sprocket holes at their bases and being tapered toward their outer ends. The films are fed to and from the drum tangentially, approaching the drum at the bottom and leaving at the top as shown in Fig. 1. The two films 8 and 9 which are to be registered on the drum pass over sprocket wheels 10, thence over rollers 16 through guide 17, over the drum, through guide 23, over rollers 24, and thence over drive sprockets 25. The sprockets 10 are fast together with their teeth in alignment and are frictionally retarded by a brake comprising a disk 11 fast to the sprocket, and a non-rotating disk 12 pressed against disk 11 by a spring 14 bearing against a nut 15 on stationary shaft 13. The sprockets 25 are also fast together with their teeth in alignment and are adapted to be driven by gear 27 on shaft 26. Consequently, corresponding sprocket holes in the two films are positioned in transverse alignment at each set of sprockets and the intervening film is stretched into registration, the shorter film taking the tension until the films are equalized and the other film then sharing the residual tension if any. Thus the films are brought into potential registry before contacting with each other at point $a$ and as they move upon the drum they may be more accurately registered by the tapered pins 18.

The pressure roll 19, mounted on an arm 20 swinging on shaft 21 and pressed against the drum by spring 22, presses the films into intimate contact as they advance upon the drum; and the films are then held in contact until they leave the drum at point $b$ with the relatively light pressure resulting from the tension of the films between sprockets 10 and 25. The drum 7 is preferably rotated solely by the films.

In imbibition printing one of the films, e. g. the inner film 8 would be in the form of a relief or other matrix, while the other film might be a blank film provided with a dye-absorbent gelatine coating. With the matrix dyed in any suitable way pictures are printed on the blank film in transit around the drum, the roller 19 pressing the films in intimate dye-transferring contact and the aforesaid tension retaining the films in close contact until the films leave the drum, the speed of the films being so adjusted that the dye transfer is completed before the films separate.

In cementing two complemental films together cement is applied to one or both films before they contact and the cemented films pass off the drum to the same sprocket wheel, e. g. the lower wheel 25.

The embodiment shown in Figs. 2 and 3 is similar to that shown in Fig. 1 in that it comprises frictionally retarded sprockets 10', rollers 16', guide 17', pressure roll 19, drum 7ª, registering teeth or pins 18', and drive sprockets, now numbered 33. Take-up rolls 31 and 32 are also shown in Fig. 2. However, this embodiment differs from that shown in Fig. 1 in that additional rolls 25' are provided and in that the teeth 18' are mounted in a different manner. The rolls 25' may be employed positively to hold the sprocket holes of the two films in transverse alignment intermediate the sprockets 10' and 33, and one of the rolls 16', e. g. the upper roll, may be in the form of a dye roll or cement roll for applying dye or cement to one of the films.

The pins 18' are mounted on spokes 28 which are mounted in the hubs 30. The spokes 28 are movable circumferentially, as for example, by flattening the portions 29 so that they may flex circumferentially, the flexible portions having sufficient elasticity normally to hold them in radial position and to urge them into radial position when flexed to one side of this position. The spokes 28 extend outwardly through slots in the periphery of the drum, whereby the pins 18' may move circumferentially of the drum to accommodate themselves to the sprocket holes in the films. In this way the films are not forced to conform to a predetermined spacing of the pins but are merely forced to conform to each other, the pins merely interlocking the films together. This arrangement accommodates variations in the spacing of the sprocket holes due either to unequal shrinkage or to different degrees of stretching.

In Figs. 4 and 5 is disclosed a modified form of registering drum 7ᵇ which may be substituted for drum 7ª in Fig. 2. The periphery of the drum has radially extending marginal flanges 35 forming a guideway for the films and a hub 36 slotted at 37 to receive the base portions of flat spring spokes 38 (Fig. 5). These spokes may have flanged portions 39 extending perpendicularly to one surface thereof to be made fast to the web 40 of the drum 7ᵇ in any suitable manner as by screws 41. The free ends of aligned pairs of spokes 38 are tied together by cross pieces 42 having film engaging pins 43 extending through peripheral slots 44 in the guideway of the drum. The cross pieces 42 extend through slots in the web 40 of the drum (Fig. 4) and may be fastened to the spring spokes 38 by bolts 45. The spring spokes of the modification shown in Figs. 4 and 5 operate in the same manner as spokes 28 in Figs. 2 and 3 to effect stretching and exact registration of the films.

The modified form of apparatus disclosed in Fig. 6 provides means for positively moving the registering pins against a yielding force to stretch the films prior to the application of pressure. Films 8 and 9 pass from magazine drums 46 and 47 over retarding sprockets 48 and 49 and thence together partly around registering drum 7ᶜ where heavy pressure is applied thereto by pressure roller 50. While still in contact the films leave registering drum 7ᶜ and pass around spokeless drum 51, the films still in contact passing from drum 51 around drive sprocket 52, the films being maintained in contact with the sprocket by a guide roller 53. Then the films are separated and wound upon frictionally driven take-up drums 54 and 55.

Adjacent registering drum 7ᶜ is a cam plate 56 fast to the frame (not shown) in which the apparatus is supported. The cam plate 56 has a cam groove 57 comprising a lower run extending from point $a$ to point $b$ whence the groove rises at $c$ to the intermediate level, which extends to point $d$, thence to a high run $e$ of short duration which gradually merges into the low run at point $a$.

The registering drum 7ᶜ is disclosed in detail in one form in Figs. 7 and 8, and in another form in Figs. 9 and 10. In the form shown in Figs. 7 and 8 the registering pins 58 are supported on cross bars 59 extending through a slot in the web of the drum 7ᶜ, each bar being integral with or otherwise fast to an arm 60 substantially parallel to the web of the drum and mounted for swinging movement thereon by means of a pivot 61. There is likewise supported upon pivot 61 a sliding tension frame 62 having slots 63 through which pivot 61 extends, the free end of the frame terminating adjacent the upturned end 64 of arm 60, the latter supporting a tension rod 65 extending within the frame 62. Between head 66 of rod 65 and the lower end of frame 62 is a spring 67 adapted to be adjustably tensioned by an adjusting nut 68 on the end of rod 65. Frame 62 has oppositely disposed ears 69 and 70 extending therefrom which normally contact pins 71 on an arm 72 pivoted on pivot 61. Arm 72 has a post 73 extending therefrom upon which is a roller 74 which extends into the cam groove 57 in cam plate 56.

Referring now to Fig. 6 for a description of the operation of registering pins 58 for stretching the films into registration, roller 74 takes the extreme rise in the cam groove 57 at $e$ or just as the films 8 and 9 reach the vicinity of the drum $7^c$; hence the arm 72 is rocked upwardly, one of the pins 71 acting upon ear 70 to swing frame 62 and arm 60 to the right (Fig. 7), so that the registering pins are swung to the left to facilitate the entrance thereof into the sprocket openings of the films. Immediately thereafter the roller 74 follows the downward slope of the cam groove 57 to the point $a$. This swings arm 72 downwardly so that the other pin 71 operates upon ear 69 of frame 62 to swing the frame and arm 60 to the left, thus moving pins 58 to the right to stretch the films against the pull of the retarding sprockets 48 and 49. If the tension of the films exceeds the tension of spring 67 the arm 60 may remain stationary while the frame 62 moves upwardly against the tension of spring 67 to the limit of slots 63 so that the lifting effect of pin 71 upon ear 69 will not serve to swing arm 60 and thus damage the film. Hence it will be apparent that this arrangement provides a positive means for moving the registering pins 58 to stretch the films into registration but that this stretching effect is limited by the tension placed upon the spring 67 which will yield and permit frame 62 to move upwardly and the arm 60 to remain relatively stationary if the pull upon the films is such as to be likely to damage the latter.

The modified form of drum $7^a$ disclosed in Figs. 9 and 10 is similar to the form shown in Figs. 7 and 8, the difference consisting in the substitution of a tension arm 75 in place of the tension frame 62 which produces a somewhat lighter structure. The device is otherwise essentially the same and operates in the same manner.

In the modification shown in Figs. 11 and 12 the exact registration of the films takes place entirely upon the registering drum $7^d$. The path of films 8 and 9 in this instance is from suitable reels not shown to registering drum $7^d$ at the point $h$, thence half way around the drum to the point $i$ where the spring-pressed roller 77 forces the two films together. At the point $j$ the films still pressed together are transferred to a spokeless drum 78 where the films are held together for a predetermined time and thence to the take-up reels 79 and 80 which may be frictionally driven to pull the films through the apparatus.

The registering frame $7^d$ is mounted for rotation on a shaft 81 supported in suitable bearings in stationary side plates 82. The hub 83 of the registering drum has attached thereto a flanged plate 84 in the flanges 85 of which are pivoted spokes 86. These spokes extend through guide openings or slots 87 in annular flanges 88 mounted in spaced relation upon a plate 89 from which extends the circular disc or web 90 which supports the peripheral surface 91 upon which the films 8 and 9 are disposed. Spokes 86 are provided adjacent free ends with weights 92. Disposed intermediate weighted spokes 86 and extending from slotted flanges 88 are spring spokes 93 which as illustrated are similar in all respects to spring spokes 28 shown and described in the modification of the apparatus disclosed in Figs. 2 and 3. The free ends of spring spokes 93 are provided with pins 94 and 95, pin 94 completely filling the sprocket opening in the film both lengthwise and crosswise as clearly indicated in Fig. 13 and pin 95 closely fitting the sprocket openings longitudinally but not transversely. The pins 96 upon the weighted spokes do not closely fit the sprocket openings in the film in either direction as shown in Fig. 13 for a purpose presently to be described.

Extending adjacent registering drum $7^d$ for substantially one-quarter of its circumference are spacing tongues 97 fastened upon side plates 82 in which the drum is supported. These spacing tongues as shown in Fig. 12 extend inwardly between the marginal portions of the films 8 and 9 and prevent the two films from coming into direct contact during the period of relative adjustment between the films for effecting exact registration.

The operation of the apparatus disclosed in Fig. 11 is as follows. Films 8 and 9 approach registering drum $7^d$ tangentially at the base thereof as indicated in Fig. 11, matrix film 8 extending between spacing tongues 97 and supporting surface 91 of the drum and blank film 9 being disposed outwardly of spacing tongues 97, although the pins 94, 95 and 96 on spokes 86 and 93 extend through the sprocket openings of both films. As drum $7^d$ turns in the direction of the arrow the weights 92 upon spokes 86 tend to draw down upon the film against spring spokes 93. This drawing force or pulling upon the superposed films, which are retained out of contact by spacing tongues 97, reaches its maximum when the spokes are horizontally disposed and adjacent the point where spacing tongues 97 terminate, namely at point $k$. By the time point $k$ is reached the pulling effect produced by the weighted spokes will have brought the films into exact superposition. This drawing effect is most pronounced upon the inner or matrix film 8 which is supported by surface 91 of the drum, hence a much greater pulling force can be used upon the film than is possible with apparatus of the type shown in Figs. 1 and 2 where the film is not supported. Tests have demonstrated that force to the extent of two pounds per square inch may be applied to a film so supported without tearing the sprocket holes as compared with one-fifth of that force when the film is not supported on a smooth surface.

The manner in which the spring and weight spokes act upon the superposed films is clearly illustrated by the plan view of Fig. 13 where the pins 94 and 95 of the spring spokes bring the two films into accurate transverse alignment and pins 96 of the weighted spokes through their stretching effect produces accurate registration longitudinally. The pressure for forcing the two films into contact to begin the imbibition process is applied at the top of the drum $7^d$ where the pulling effect of the weights on spokes 86 is neutralized. The two films are thence held together by light pressure imposed by the drawing effect upon the film by the take-up reels 79 and 80 during the period in which the two films remain together, namely, on registration roller $7^d$ from the point $i$ to the point $j$ and on the imbibition drum 78 from the point $j$ until the films pass therefrom to their separate take-up reels. As the films pass beyond the point $i$ at which pressure is applied, the weighted spokes 86 produce a pulling effect upon the films in the opposite direction to that previously applied and prevents creeping or relative movement of the films upon one another under the heavy pressure of imbibition roller 77.

Experiments have demonstrated that the transferring of images by imbibition is best effected by a heavy pressure applied momentarily followed by a light pressure extending over a period of 20 or 30 seconds and that thereafter the process continues until completed with the films in contact whether or not pressure is applied thereto. In the apparatus disclosed in Fig. 11, provision is made for all of the steps in the process as outlined above, a heavy pressure being applied at the point $i$, the lighter pressure being maintained from the point $i$ to the point $j$. After passing point $j$, pressure upon the two films is not essential but light pressure is still applied thereto due to the drag on the films produced by the frictionally driven take-up reels 79 and 80. The process is similarly completely performed by the apparatus disclosed in Fig. 6. If desired, an imbibition drum such as 51 (Fig. 6) or 78 (Fig. 11) may be used with the apparatus shown in Fig. 1 or Fig. 2.

If desired a preliminary stretching of the films may be effected before the latter pass upon registering drum $7^d$ (Fig. 11). One form of apparatus for this purpose may comprise sprockets 98 and 99, each engaging the sprocket openings in one of the films. These sprockets may be geared together to turn at the same rate and one may be provided with a brake drum 100 having an adjustable brake band 101 frictionally engaging the same whereby the rotation of both sprockets is equally retarded for the purpose of stretching the films.

From the above it will be apparent that the forms of apparatus disclosed provide for the continuous printing of strip films by imbibition, that the films are accurately registered both longitudinally and laterally before they are permitted to come into intimate contact, that by the provision of a pulling force against yielding or retarding mechanism the shorter of the two films is selectively and automatically stretched to conform to the longer film without danger of injury to either, that the heavy pressure necessary to force the films into contact to begin the imbibition process is applied immediately after the films are brought into exact registration and while they are so held, that the films are restrained against relative movement during the application of pressure, and that the films are maintained in contact under light pressure thereafter until the transfer of images is completed.

By spacing the film-advancing means (sprockets 25 in Fig. 1) and the film-retarding means (sprockets 10) equal distances along the paths of the films and arranging the retarding sprockets to operate conjointly so that the shorter film is subjected to all the retarding force until it is stretched to conform to the other film and then both films are subjected to the residual stretching force, the films are automatically registered intermediate the sprockets irrespective of variations in the inequalities of the films throughout their lengths; that is, the retarding forces are automatically proportioned, between the respective films in accordance with the difference in length of the films so that the films are always registered. If the difference in length of the two films increases a greater proportion of the retarding force is applied to the shorter film and less residual force remains to be counteracted by the longer film; if the difference in length decreases more of the force is applied to the longer film; if corresponding portions of the films are equal in length the films are stretched equally; and if throughout subsequent portions the inequality is reversed then the greater proportion of the retarding force is automatically shifted to the other film.

We claim:

1. In the art of cinematography the method which comprises continuously feeding two films into superposed contact, and applying a retarding force to both films conjointly in advance of the line of contact, so that the shorter film is subjected to all the force until it is stretched to conform to the other film and then both films are subjected to the force.

2. In the art of cinematography the method which comprises continuously feeding two films along juxtaposed paths, positively advancing and conjointly retarding the films by engagement with registering openings spaced apart equal distances along said paths respectively, thereby to stretch the films to equal lengths, and pressing the stretched films into registered contact.

3. The method of bringing two films into registration as they continuously travel along adjacent paths which comprises applying advancing and retarding forces to the films at spaced points along their paths, and automatically proportioning the retarding forces acting on the respective films in accordance with the difference in length of the two films.

4. Cinematographic apparatus comprising means for continuously advancing two films in synchronism along adjacent paths, and means in the rear of said means for conjointly retarding the two films severally to register the portions intermediate the two means.

5. Cinematographic apparatus comprising mechanism for synchronously advancing two films along adjacent paths, and means in the rear of said mechanism for frictionally retarding the two films, said means acting conjointly on the two films so that the retarding force is applied predominantly to the shorter film irrespective of which film is the shorter.

6. Cinematographic apparatus comprising mechanism for synchronously advancing two films along adjacent paths, and brake means in the rear of said mechanism for frictionally retarding the films proportioning the retarding forces between the respective films in accordance with the relative lengths of the films.

7. Cinematographic apparatus comprising mechanism for synchronously advancing two films along adjacent paths, unitary sprocket-wheel means engaging corresponding perforations in the two films, and means frictionally retarding said means, whereby retarding forces are automatically proportioned between the films in accordance with the relative lengths of the films.

8. Cinematographic apparatus comprising mechanism for synchronously advancing two films along adjacent paths, interconnected sprocket idler wheels engaging corresponding sprocket holes in the respective films, and means for frictionally retarding said interconnected wheels.

9. In the art of cinematography the method which comprises continuously feeding two films along juxtaposed paths, and at equally spaced locations along the respective paths holding corresponding sprocket holes of the films opposite to each other, with the intervening portions of the films under tension, thereby to register the intervening portions before coming in contact.

10. Apparatus for producing cinematographic films by imbibition comprising means cooperating with the sprocket openings of a blank film and a matrix film at points spaced equidistantly along the respective films continuously to bring successive portions of said films first into potential registration and thereafter into exact registration, and means for forcing the registered portions of the films into intimate contact and for holding them in this position until the imbibition process is complete.

11. Apparatus for bringing cinematographic films into registration which comprises means for continuously advancing two films in juxtaposed relationship, and means including members entering corresponding spocket openings in both films to bring the films into potential registration, and means for applying the same retarding force to certain of said members whereby tension is applied to the films to stretch the latter into exact registration while in motion.

12. Apparatus for bringing cinematographic films into registration which comprises means for continuously advancing two films in juxtaposed relationship and means for simultaneously applying yielding tension to said films selectively and automatically to stretch the shorter film into registration with the longer film while the films are in motion.

13. In a device for the continuous printing of cinematographic films by imbibition, apparatus for continuously bringing a matrix film and a blank film into exact registration comprising spaced means adapted to maintain a yielding tension on said films, the shorter film receiving the full stretching force until it conforms to the longer film.

14. Cinematographic apparatus comprising a film drum, means for feeding a plurality of films tangentially to the drum, thence partially around the drum in superposition and thence tangentially from the drum, said means including film advancing members engaging the films after the films have left the drum at points equidistant from the points where the films leave the drum, and means for accurately registering the portions of the films on the drum.

15. Cinematographic apparatus comprising a film drum, means for feeding a plurality of films tangentially to the drum, thence partially around the drum in superposition and thence tangentially from the drum, said means including film advancing members engaging the films at corresponding points after the films have left the drum, yielding means for stretching the portions of the films on the drum into longitudinal registration and means for accurately registering the portions of the films on the drum.

16. Cinematographic apparatus comprising a film drum, means for feeding a plurality of films tangentially to the drum, thence partially around the drum in superposition and thence tangentially from the drum, registering pins extending radially from the drum, and means supporting the pins for peripheral movement to accommodate the dimensions between the holes of the stretched films.

17. Cinematographic apparatus comprising a film drum, means for feeding a plurality of films tangentially to the drum, thence partially around the drum in superposition and thence tangentially from the drum, said means including film advancing members engaging the films at corresponding points after the films have left the drum, registering pins extending radially from the drum, and means supporting the pins for peripheral movement to accommodate the dimensions between the holes of the stretched films.

18. Cinematographic apparatus comprising a film drum, means for feeding a plurality of films tangentially to the drum, thence partially around the drum in superposition and thence tangentially from the drum, said means including film advancing members engaging the films at corresponding points after the films have left the drum, yielding means for stretching the portions of the film on the drum into longitudinal registration, registering pins extending radially from the drum, and means supporting the pins for peripheral movement to accommodate the dimensions between the holes of the stretched films.

19. Cinematographic apparatus comprising a film drum, means for advancing a plurality of films around the periphery of the drum in superposition, registering pins extending radially from the drum for registering the films, and means supporting the pins for movement circumferentially of the drum, whereby the pins may move relatively to the drum to accommodate different spacing of the registering openings in the films.

20. In the art of cinematography the method which comprises continuously advancing two films into contact and applying a retarding force to the films in a manner selectively effective upon the shorter film to stretch it into exact registration with the longer film.

21. In the art of cinematography the method which comprises continuously advancing two films into contact and applying a retarding force to successive corresponding portions of the films in a manner selectively effective upon whichever portion is the shorter to stretch it into exact registration with the longer portion.

22. Apparatus for bringing cinematographic films into registration which comprises means for continuously advancing two films into contact and means for applying a retarding force to the films selectively and automatically to stretch the shorter film into exact registration with the longer film.

23. Apparatus for bringing cinematographic films into registration which comprises means for continuously advancing two films into contact and means for applying a retarding force to successive corresponding portions of the films selectively and automatically to stretch the shorter portion into exact registration with the longer portion regardless of unequal and uneven shrinkage of the films.

24. Apparauts for bringing cinematographic films into registration which comprises means for continuously advancing two films into contact, means entering spaced corresponding openings in both films, and means for applying a retarding force to the films through the rearmost of said first means selectively and automatically to stretch the shorter film into exact registration with the longer film regardless of unequal and uneven shrinkage of the films.

25. Apparatus for bringing cinematographic films into registration which comprises means for continuously advancing two films into contact members having teeth arranged to engage spaced corresponding openings in both films, and means applying a retarding force to the films through the rearmost of said teeth selectively and automatically to stretch the shorter film into exact registration with the longer film regardless of unequal and uneven shrinkage of the films.

26. In the art of cinematography the method which comprises continuously advancing two films into contact, conjointly applying a retarding force to the films, and causing the retarding force to be exerted upon successive overlapping and corresponding sections of the films so that the shorter section is selectively stretched into exact registration with the longer.

27. Apparatus for bringing cinematographic films into registration which comprises means for continuously advancing two films in juxtaposed relationship, means for conjointly applying a retarding force to both films before they contact and causing the retarding force to be exerted upon successive overlapping and corresponding sections of the films whereby the shorter section of the two films is selectively stretched into exact registration with the longer before they contact.

28. A method of bringing cinematographic films into registration which comprises supporting portions of the films in registered relationship and simultaneously advancing the films by tension automatically applied to the shorter of the films.

29. The method of bringing cinematographic films into registration which comprises supporting portions of the films in approximate registration, applying tension to the films, and obtaining final registration of the films by automatically retarding the advancing movement of the shorter film to increase the tension thereon.

30. Apparatus for bringing cinematographic films into registration including separate film idler sprockets, means connecting the sprockets for synchronous movement, means in advance of said sprockets for feeding the films, and means for retarding said sprockets, whereby the tension will act primarily on the shorter of the films.

31. Apparatus for treating cinematographic films including feed and tension sprockets and a film receiving drum intermediate said sprockets, said drum bearing sets of spaced film sprocket hole engaging pins and means for relatively shifting individual sets of pins.

JOSEPH A. BALL.
ERNEST A. GALLISON.
EASTMAN A. WEAVER.